United States Patent [19]
Evans

[11] Patent Number: 6,094,339
[45] Date of Patent: Jul. 25, 2000

[54] CAPACITOR WITH SPIRAL ANODE AND PLANAR CATHODE

[75] Inventor: David A. Evans, Seekonk, Mass.

[73] Assignee: Evans Capacitor Company Incorporated, East Providence, R.I.

[21] Appl. No.: 09/205,715

[22] Filed: Dec. 4, 1998

[51] Int. Cl.[7] ....................................................... H01G 9/04
[52] U.S. Cl. .......................... 361/516; 361/508; 361/517; 361/529; 361/532
[58] Field of Search ....................................... 361/500, 502, 361/503, 504, 505, 506, 508, 509, 510, 511, 512, 516, 517, 519, 520, 530, 523, 524, 528, 529, 531–532, 540, 301.5; 29/25.03

[56] References Cited

U.S. PATENT DOCUMENTS

| | | | |
|---|---|---|---|
| 5,369,547 | 11/1994 | Evans | 361/516 |
| 5,469,325 | 11/1995 | Evans | 361/526 |
| 5,559,667 | 9/1996 | Evans | 361/526 |
| 5,737,181 | 4/1998 | Evans | 361/504 |
| 5,754,394 | 5/1998 | Evans et al. | 361/516 |

*Primary Examiner*—Kristine Kincaid
*Assistant Examiner*—Eric Thomas
*Attorney, Agent, or Firm*—Leydig, Voit & Mayer

[57] ABSTRACT

A capacitor including a substantially planar electrochemical cathode including a porous coating; a spirally wound anode having an edge, the edge being disposed opposite and generally parallel to the cathode, the anode being selected from the group including tantalum, aluminum, niobium, zirconium, and titanium; an electrically insulating separator interposed between the cathode and the anode; and an electrolyte disposed between and in contact with the cathode and the anode.

26 Claims, 1 Drawing Sheet

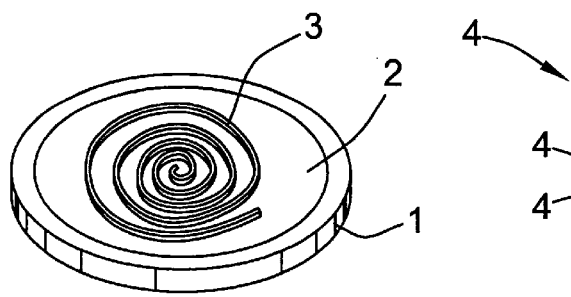
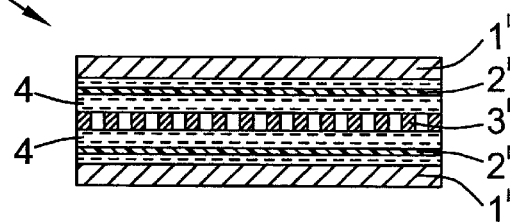
FIG. 1  FIG. 2
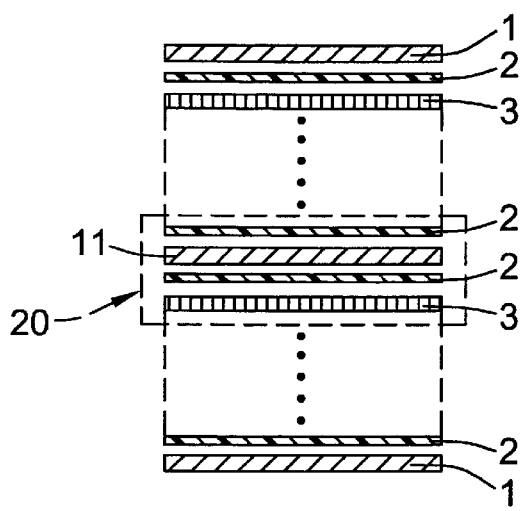
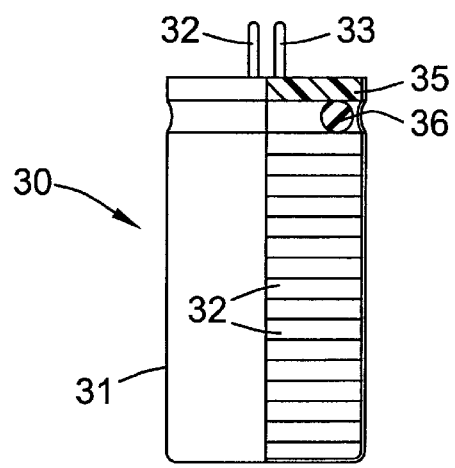
FIG. 3  FIG. 4
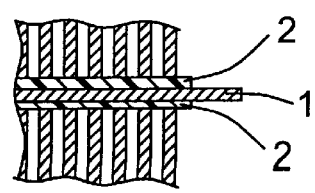
FIG. 5

CAPACITOR WITH SPIRAL ANODE AND PLANAR CATHODE

FIELD OF THE INVENTION

The present invention concerns an improved capacitor including a substantially planar cathode and a spirally wound anode having an edge facing the cathode. The invention particularly concerns a capacitor including a pseudo-capacitor cathode and a wet slug anode.

BACKGROUND ART

Electrolytic capacitors have long been known in the electronic arts. One well known electrolytic capacitor structure includes two metal foils, acting as cathode and anode, and two electrically insulating separators that allow electrical communication between the two foils by means of an electrolyte that is in contact with the foils and permeates the separator. Two separator sheets are required because the two foils and separators are spirally wound together, in the fashion of a jelly roll. The resulting cylindrical structure has a cross-section transverse to the axis of the spiral that includes the interleaved spiral layers of metal foil, separator, metal foil, and separator. This capacitor structure is easily manufactured but has limitations with regard to the density of stored energy. The second separator, which is necessary because of the winding of the foils, occupies a volume that is not occupied in, for example, a parallel plate capacitor using the two foils and only a single separator. The jelly roll structure is also limited to electrode materials that are highly flexible so that they can be wound to increase the density of stored energy.

Capacitor structures providing significantly improved density of stored energy are described in my U.S. Pat. Nos. 5,369,547, 5,469,325, 5,559,667, 5,737,181, and 5,754,394, the disclosures of which are incorporated herein by reference. In the capacitors described in my patents, a conventional anode from a wet slug capacitor is employed in combination with a cathode typically found in an electrochemical capacitor, sometimes called a pseudo-capacitive electrode.

The typical anode materials in wet slug capacitors are valve metals, i.e., metals that form an oxide naturally that may be thickened by anodic oxidation. Examples of such metals suitable for use in these anodes are tantalum, aluminum, niobium, zirconium, and titanium.

The cathodes of electrochemical capacitors are typically highly porous films that have extremely high surface areas. These cathodes may be metal oxides, nitrides, or carbides. The metals from which these oxides are formed include ruthenium, iridium, rhodium, platinum, palladium, osmium, cobalt, molybdenum, and tungsten. Suitable nitrides are made from titanium, vanadium, zirconium, nickel, molybdenum, and tungsten. Carbides usable in cathodes include vanadium, nickel, molybdenum, and tungsten carbides In addition, finely divided carbon, which has a large surface area, can function as an electrochemical cathode. As described in my prior patents, the metal oxide films are typically formed on a substrate, for example, by spraying the substrate with a compound of the metal and subsequently oxidizing the metal in the deposited film. My prior patents describe various arrangements of cathodes and anodes in capacitors employing an electrochemical cathode and a wet slug anode. The cathodes are relatively rigid in the specific cathode structures described in my prior patents and are not susceptible to winding in a jelly roll structure like the cathodes of known spirally wound electrolytic capacitors.

SUMMARY OF THE INVENTION

It is an object of the invention to provide an improved capacitor employing, at least in part, a spirally wound electrode structure, having a high stored energy density, and a simple construction.

According to a first aspect of the invention, a capacitor includes a substantially planar electrochemical cathode; a spirally wound anode having an edge, the edge being disposed opposite and generally parallel to the cathode, the anode being selected from the group including tantalum, aluminum, niobium, zirconium, and titanium; an electrically insulating separator interposed between the cathode and the anode; and an electrolyte disposed between and in contact with the cathode and the anode.

According to a second aspect of the invention, a capacitor includes a spirally wound anode having a pair of edges, the anode being selected from the group including tantalum, aluminum, niobium, zirconium, and titanium; first and second electrically insulating separators sandwiching the spirally wound anode, the first and second separators being disposed generally parallel to the edges of the spirally wound anode; first and second substantially planar electrochemical cathodes, the first and second cathodes sandwiching the anode and the first and second separators and being generally parallel to the first and second separators; and an electrolyte disposed between and in contact with the first and second cathodes and the anode.

According to a third aspect of the invention, a capacitor includes a plurality of unit capacitor cells laminated in a stack having first and second ends, each capacitor unit cell contacting at least one other unit cell, each capacitor unit cell comprising a substantially planar electrochemical cathode on each of two opposed surfaces; and first and second electrically insulating separators sandwiching and generally parallel to the cathode; and a spirally wound anode having an edge, disposed adjacent the second separator with the second separator sandwiched between the cathode and the anode and the edge generally parallel to the cathode, the anode being selected from the group including tantalum, aluminum, niobium, zirconium, and titanium; a first end unit located at the first end of the stack, opposite the first separator of a unit capacitor cell, and including, serially arranged, a spirally wound anode having an edge generally parallel to the cathode of the unit cell, the anode being selected from the group including tantalum, aluminum, niobium, zirconium, and titanium, and disposed adjacent the first separator at an end of a unit capacitor cell; an electrically insulating separator; and a generally planar electrochemical cathode; and a second end unit located at the second end of the stack, opposite the anode of a unit capacitor cell, and including, serially arranged, an electrically insulating separator disposed adjacent the anode at an end of a unit capacitor cell; and a generally planar electrochemical cathode; and an electrolyte disposed between and in contact with all of the cathodes and anodes of the capacitor.

BRIEF DESCRIPTION OF THE DRAWINGS

FIG. 1 is perspective, exploded schematic view of a fundamental capacitor according to an embodiment of the invention.

FIG. 2 is a schematic cross-sectional view of a capacitor cell according to an embodiment of the invention.

FIG. 3 is a sectional view illustrating a capacitor including multiple unit capacitor cells according to an embodiment of the invention.

FIG. 4 is a schematic, partly cut-away view of a laminated capacitor structure within a container according to an embodiment of the invention.

FIG. 5 is a detailed view of a part of the capacitor of FIG. 4 illustrating the structure of a cathode terminal for interconnection of the unit capacitor cells of the cathodes.

DESCRIPTION OF PREFERRED EMBODIMENTS

FIG. 1 is a highly schematic perspective view of a basic capacitor according the invention. The capacitor includes a substantially planar cathode 1, an electrically insulating separator 2, and a spirally wound anode 3, arranged serially. In addition to these fundamental elements in FIG. 1, an electrolyte (not shown in FIG. 1) is present that is in contact with the cathode 1 and the anode 3, permeating the separator 2.

In the embodiment of FIG. 1 and other preferred embodiments of the invention, the cathode 1 is the kind of cathode that is employed in an electrochemical capacitor and described in my previous patents. The cathode 1 includes a substrate, preferably a metal, on which is disposed a porous coating. In this description, these cathodes are referred to as electrochemical cathodes. In an electrochemical cathode, the coating may be an oxide of at least one metal selected from the group consisting of ruthenium, iridium, rhodium, platinum, palladium, osmium, cobalt, molybdenum, and tungsten. The oxide film may be prepared, as described in my previous patents, by depositing a liquid solution of a compound of the metal on the substrate, drying the solution with heat, in air, converting the metal compound to a metal oxide. Other coatings encompassed within the term "electrochemical" cathode, as used here, include nitrides of titanium, vanadium, zirconium, nickel, molybdenum, and tungsten; carbides of vanadium, nickel, molybdenum, and tungsten; and finely divided carbon. These porous coatings have relatively large surface areas per unit weight. Thus, these cathodes are particularly effective in increasing the density of energy storable in a capacitor employing the cathodes. The substrate on which the coating is disposed may be any conveniently available material, preferably a metal, and is preferably a relatively thin foil so that the substrate does not occupy substantial volume, increasing the density of energy storable in the capacitor. The substrate must be electrochemically stable, considering the other elements of the capacitor, particularly the electrolyte.

The anode 3 is a metal foil spirally wound in a coil. Although the coil is shown as loosely wound in the figures for purposes of explanation, in practice, the coil may be tightly wound. Adjacent windings in the coil are not in perfect contact with each other. The small spaces between windings assist in distributing the electrolyte.

The orientation of the spirally wound anode 3 with respect to the generally planar cathode 1 is an important feature of the invention. As shown in FIG. 1, an edge of the spirally wound anode lies in a plane generally parallel to the plane of the cathode. In other words, the axis about which the spiral coil is wound is substantially transverse to the plane of the cathode. Put another way, the edge of the spirally wound anode faces and is directly opposite the substantially planar cathode.

In the invention, the total area of the anode directly facing the cathode is reduced compared to a parallel plate capacitor. However, the electrolyte, by flowing into the spaces between the windings by capillary action, establishes communication between the cathode and all of the surface area of the anode.

In order to achieve a high density of stored energy, it is preferable that a capacitor according to the invention employ an electrochemical cathode. The anode 3 is a valve metal including an oxide coating that may be anodically thickened. In other words, it is preferred that the anode be made of one of tantalum, aluminum, niobium, zirconium, and titanium. Most preferably, the anode 3 is aluminum and the cathode 1 comprises a ruthenium oxide coating.

As in all electrolytic capacitors, an electrolyte is disposed between and in contact with the anode and the cathode. In order to avoid short-circuiting of the anode to the cathode, an electrically insulating separator 2 is interposed between those electrodes. The separator must permit electrical communication between the anode and cathode through the electrolyte. Examples of useful separator materials are paper, porous polymeric materials, and woven or non-woven fabrics of natural and artificial fibers that are compatible with the electrolyte used in a particular capacitor construction. The separator should be as thin as possible to increase the density of energy storable without undue risk of short-circuiting through deterioration or failure of the separator material. Although FIG. 1 and other figures show spaces between the cathode 1, the separator 2, and the anode 3, in practice, these elements are in contact with each other, serially.

The electrolyte and the material of the separator 2 are chosen to be compatible with the materials of the anode and cathode. The electrolyte may be sulfuric acid, potassium hydroxide, or an ammonium salt dissolved in a non-aqueous solvent, such as a glycol or a glycol-like solvent. The latter, non-aqueous electrolyte is preferred when the anode is aluminum since aqueous electrolytes are incompatible with aluminum. Sulfuric acid may be used as the electrolyte when the anode is tantalum. In a preferred embodiment, employing an aluminum anode and a ruthenium oxide cathode, the electrolyte is an ethylene glycol solution in which is dissolved an ammonium salt. Such an electrolyte is commercially available from Iksan Technology Company of Seoul, Korea, as electrolyte SLO7E. In this preferred embodiment, the separator 2 may be a commonly available paper, such as kraft paper, having a thickness of about 0.0005 inch (12.7 microns). Other kinds of paper, including newsprint, can be used as well.

In a preferred embodiment, the anode 3 is made from a metal foil having a high degree of crystalline orientation. The preferred foil has a thickness of about 100 microns and is anisotropically etched to roughen the surface and form lacunae generally perpendicular to the surface of the foil. When the foil has a high degree of crystalline orientation, the anisotropic etching is possible, effectively increasing the surface area and further increasing the density of energy storable in the capacitor. Such oriented, etched, large area foils are available from Matsushita Electronic Components of Knoxville, Tenn.

In a preferred embodiment, the width of the anode, measured essentially perpendicular to the cathode 1, ranges from 0.125 to 0.375 inch (3.2 to 9.6 millimeters) in order to simplify the making of electrical connections to the anode and to produce an anode of reasonable electrical resistance. Narrower anodes have decreased time constants and present some handling issues. The diameter of the spirally wound anode may be any size that achieves a desired capacitance. Typical diameters range from 1 to 3 inches (25.4 to 76.2 millimeters), although there is no limitation on either diameter or width of the foil of the anode.

FIG. 2 is a schematic cross-sectional view of a capacitor cell according to an embodiment of the invention. The capacitor cell 10 of FIG. 2 includes, fundamentally, the same elements as the embodiment of FIG. 1. However, the spirally wound anode 3 is disposed in the center of the cell and is sandwiched between separators 2 and 2'. That laminar stack of three elements is, itself, sandwiched between cathodes 1 and 1'. The separators 2 and 2' are identical as are the cathodes 1 and 1'. These elements are illustrated as being separated in FIG. 2 with the electrolyte 4 interposed between each pair of elements. In an actual capacitor cell 10, each of the elements in the laminated structure is in direct contact with the neighboring elements. The materials employed in each of these elements are the same as those described with reference to the embodiment of FIG. 1.

FIG. 3 schematically illustrates a more complex capacitor structure according to an embodiment of the invention. While the capacitor structure of FIG. 2 includes an anode 3 opposed to each of two cathodes 1 and 1', in the laminated structure of FIG. 3, providing still larger capacitance, each of the cathodes 11 within a unit cell 20 is opposed to two anodes 3. The elements identified in FIG. 3, and in all other figures with the same reference numbers, have the same structure.

In the structure of FIG. 3, the electrochemical cathode 11 includes a substrate having opposite sides, each of the opposite sides being covered with a porous coating. In order to increase the capacitance of a capacitor according to the invention, the unit cells 20 of FIG. 3 are laminated. Each unit cell includes two separators, 2 and 2', sandwiching the double-sided electrochemical cathode 11. In addition, an anode 3 is disposed adjacent one of the separators 2 in the unit cell 20.

The unit cells 30 of FIG. 3 can be serially stacked as a central part of a capacitor structure. The stack of unit cells has, at a first end, a separator 1 and, at a second end, an anode 3. In order to complete the capacitor structure, at the first end, a first end unit is attached to the stack of unit capacitor cells. The first end unit includes, serially arranged, a single-sided electrochemical cathode 1, a separator 2, and an anode 3. The first end unit is joined to the laminated stack of unit cells 20 with the anode 3 in contact with the separator 2 of a unit cell 20. A second end unit including a separator 2 and a single-sided electrochemical cathode 1 are joined at the second end of the laminated stack, with the separator 2 in contact with the anode 3 that is exposed at the second end of the laminated stack of unit cells 20. The resulting capacitor has, at its opposite ends, two cathodes. The resulting structure can also be considered the result of stacking capacitor cells according to the embodiment of FIG. 2 with every internal electrochemical cathode 1, i.e., every cathode not at the end of the stack, being required to be a double-sided cathode 11.

FIG. 4 is a schematic, partially cut away view of capacitor 30 according to an embodiment of the invention. This embodiment includes a container 31, typically a metal or plastic container. Within the container, capacitor cells, such as the cells 10 of FIG. 1, or, with appropriate ends on the laminated stack, unit cells 20 of FIG. 3, are arranged serially. When the container 31 is metal, it may be electrically connected to function as the cathode terminal of the capacitor. Alternatively, leads 32 and 33 may protrude from a closed end of the container 31 and provide electrical terminals for the capacitor. The container 31 is closed by an end cap 35 through which the leads 32 and 33, if present, extend. In the assembled capacitor, the cap 35 is bonded or welded to the container 31 using conventional means, such as an adhesive or welding. If the end cap 35 is electrically conductive, then leads 32 and 33 extend through electrically insulating portions of the cap 35. Pressure is maintained on the laminated capacitor cells by a resilient O-ring 36 disposed between the cap 35 and the stack of capacitor cells 10 or 20. Since the total capacitance of capacitors connected in parallel is the sum of the individual capacitances, it is desirable to make a parallel electrical connection between the cells 10 or 20 within the container 31.

FIG. 5 is a detail view illustrating part of the laminated stack of capacitor cells of the capacitor 30, particularly in the region where two spiral anodes are urged against a pair of separators and a centrally located cathode. In order to establish a parallel electrical connection between cathodes of different cells, in the embodiment of FIG. 5, the separators 2 extend beyond the spirally wound anode. In addition, the double-sided cathode 11 disposed between those separators extends still further, beyond the separators 2, providing a useful location for making an electrical connection. An electrical connection to an anode can be made by welding a wire or other lead to the outside turn of the spirally wound anode or the end of the anode winding can extend outward and may be twisted to provide an extending lead parallel or transverse to the central axis of the spirally wound anode. The anodes so extended are electrically connected together and, likewise, the cathodes so extending are connected electrically by a wire generally parallel to the central axis of the capacitor 30. The wires, if they exist, are connected to the respective terminals 32 and 33. If the container 31 is electrically conductive, either the cathodes or the anodes can be connected directly to the container.

The described capacitor provides increased energy storage density, particularly when the cathode is an electrochemical cathode, and simplicity of construction as compared to the jelly roll type capacitor. Further, capacitors having various capacitances can be easily constructed by stacking a larger or smaller number of capacitor cells or unit capacitor cells with simple electrode interconnections.

The invention has been described with respect to certain preferred embodiments. However, various additions and modifications within the scope and spirit of the invention can be made by those of skill in the art from the foregoing description. Accordingly, the invention is not limited by the embodiments described but is defined by the following claims.

What is claimed is:

1. A capacitor comprising:
    a substantially planar electrochemical cathode comprising a porous coating;
    a spirally wound anode having a surface, the surface being disposed opposite and generally parallel to the cathode, the anode being selected from the group consisting of tantalum, aluminum, niobium, zirconium, and titanium;
    an electrically insulating separator interposed between the cathode and the anode; and
    an electrolyte disposed between and in contact with the cathode and the anode.

2. The capacitor according to claim 1 wherein the porous coating comprises an oxide of at least one metal selected from the group consisting of ruthenium, iridium, rhodium, platinum, palladium, osmium, cobalt, molybdenum, and tungsten.

3. The capacitor according to claim 1 wherein the porous coating comprises a nitride of at least one metal selected from the group consisting of titanium, vanadium, zirconium, nickel, molybdenum, and tungsten.

4. The capacitor according to claim 1 wherein the porous coating comprises a carbide of at least one metal selected from the group consisting of vanadium, nickel, molybdenum, and tungsten.

5. The capacitor according to claim 1 wherein the porous coating comprises carbon.

6. The capacitor according to claim 1 wherein the porous coating comprises ruthenium oxide and the anode comprises aluminum.

7. The capacitor according to claim 1 wherein the electrolyte is selected from the group consisting of sulfuric acid, potassium hydroxide, and an ammonium salt dissolved in a glycol.

8. The capacitor according to claim 1 wherein the separator is selected from the group consisting of paper, porous plastic, and fabric.

9. A capacitor comprising:
 a spirally wound anode having a pair of surfaces, the anode being selected from the group consisting of tantalum, aluminum, niobium, zirconium, and titanium;
 first and second electrically insulating separators sandwiching the spirally wound anode, the first and second separators being disposed generally parallel to the surfaces of the spirally wound anode;
 first and second substantially planar electrochemical cathodes, each cathode comprising a porous coating, the first and second electrochemical cathodes sandwiching the anode and the first and second separators and being generally parallel to the first and second separators; and
 an electrolyte disposed between and in contact with the first and second cathodes and the anode.

10. The capacitor according to claim 9 wherein each of the porous coatings comprises an oxide of at least one metal selected from the group consisting of ruthenium, iridium, rhodium, platinum, palladium, osmium, cobalt, molybdenum, and tungsten.

11. The capacitor according to claim 9 wherein each of the porous coatings comprises a nitride of at least one metal selected from the group consisting of titanium, vanadium, zirconium, nickel, molybdenum, and tungsten.

12. The capacitor according to claim 9 wherein each of the porous coatings comprises a carbide of at least one metal selected from the group consisting of vanadium, nickel, molybdenum, and tungsten.

13. The capacitor according to claim 9 wherein each of the porous coatings comprises carbon.

14. The capacitor according to claim 9 wherein the porous coatings comprise ruthenium oxide and the anode comprises aluminum.

15. The capacitor according to claim 9 wherein the electrolyte is selected from the group consisting of sulfuric acid, potassium hydroxide, and an ammonium salt dissolved in a glycol.

16. The capacitor according to claim 9 wherein the first and second separators are selected from the group consisting of paper, porous plastic, and fabric.

17. A capacitor including:
 a plurality of unit capacitor cells laminated in a stack having first and second ends, each capacitor unit cell contacting at least one other unit cell, each capacitor unit cell comprising:
  a substantially planar electrochemical cathode comprising a porous coating on each of two opposed surfaces; and
  first and second electrically insulating separators sandwiching and generally parallel to the electrochemical cathode; and
  a spirally wound anode having an surface, disposed adjacent the second separator, with the second separator sandwiched between the electrochemical cathode and the anode and the surface generally parallel to the electrochemical cathode, the anode being selected from the group consisting of tantalum, aluminum, niobium, zirconium, and titanium;
 a first end unit located at the first end of the stack, opposite the first separator of one of the unit capacitor cells, and comprising, serially arranged,
  a spirally wound anode having a surface generally parallel to the cathode of the unit cell, the anode being selected from the group consisting of tantalum, aluminum, niobium, zirconium, and titanium, and disposed adjacent the first separator at an end of the one of the unit capacitor cells;
  an electrically insulating separator; and
  a generally planar electrochemical cathode comprising a porous coating; and
 a second end unit located at the second end of the stack, opposite the anode of one of the unit capacitor cells, and comprising, serially arranged,
  an electrically insulating separator disposed adjacent the anode at an end of the one of the unit capacitor cells; and
  a generally planar electrochemical cathode comprising a porous coating; and
 an electrolyte disposed between and in contact with all of the cathodes and anodes of the capacitor.

18. The capacitor according to claim 17 wherein each of the porous coatings comprises an oxide of at least one metal selected from the group consisting of ruthenium, iridium, rhodium, platinum, palladium, osmium, cobalt, molybdenum, and tungsten.

19. The capacitor according to claim 17 wherein each of the porous coatings comprises a nitride of at least one metal selected from the group consisting of titanium, vanadium, zirconium, nickel, molybdenum, and tungsten.

20. The capacitor according to claim 17 wherein each of the porous coatings comprises a carbide of at least one metal selected from the group consisting of vanadium, nickel, molybdenum, and tungsten.

21. The capacitor according to claim 17 wherein each of the porous coatings comprises carbon.

22. The capacitor according to claim 17 wherein each of the porous coatings comprises ruthenium oxide and each of the anodes comprises aluminum.

23. The capacitor according to claim 17 wherein the electrolyte is selected from the group consisting of sulfuric acid, potassium hydroxide, and an ammonium salt dissolved in a glycol.

24. The capacitor according to claim 17 wherein each of the separators is selected from the group consisting of paper, porous plastic, and fabric.

25. The capacitor according to claim 17 including a container containing the plurality of unit capacitor cells, the first and second end units, and the electrolyte.

26. The capacitor according to claim 17 wherein the separators of a unit capacitor cell sandwiching the cathode of the unit capacitor cell extend beyond adjacent anodes, and the cathode sandwiched by the separators extends beyond the separators for making an electrical connection to the cathode.

* * * * *